(12) United States Patent
Pelletier et al.

(10) Patent No.: US 9,113,477 B2
(45) Date of Patent: Aug. 18, 2015

(54) METHOD AND APPARATUS TO ALLOCATE RADIO RESOURCES FOR TRANSMITTING A MESSAGE PART IN AN ENHANCED RACH

(75) Inventors: Benoit Pelletier, Roxboro (CA); Eldad M. Zeira, Huntington, NY (US); Paul Marinier, Brossard (CA); Christopher R. Cave, Verdun (CA); Rocco DiGirolamo, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 874 days.

(21) Appl. No.: 12/238,546

(22) Filed: Sep. 26, 2008

(65) Prior Publication Data

US 2009/0088175 A1    Apr. 2, 2009

Related U.S. Application Data

(60) Provisional application No. 60/975,715, filed on Sep. 27, 2007.

(51) Int. Cl.
| | |
|---|---|
| *H04W 72/00* | (2009.01) |
| *H04W 4/00* | (2009.01) |
| *H04B 7/00* | (2006.01) |
| *H04W 74/08* | (2009.01) |
| *H04L 1/18* | (2006.01) |
| *H04L 1/16* | (2006.01) |

(52) U.S. Cl.
CPC ......... *H04W 74/0808* (2013.01); *H04L 1/1877* (2013.01); *H04W 74/0866* (2013.01); *H04L 1/1607* (2013.01)

(58) Field of Classification Search
CPC ............ H04I 1/1877; H04W 74/0808; H04W 74/0866; H04L 1/1607
USPC .............. 370/331, 329, 312; 455/417, 452.1
See application file for complete search history.

(56) References Cited

U.S. PATENT DOCUMENTS

| | | | |
|---|---|---|---|
| 6,226,279 B1 | 5/2001 | Hansson et al. | |
| 6,708,037 B1 | 3/2004 | Moulsley et al. | |
| 6,859,445 B1 | 2/2005 | Moon et al. | |
| 6,958,989 B1 | 10/2005 | Dick et al. | |
| 7,406,044 B2 * | 7/2008 | Cave et al. | 370/230.1 |
| 8,060,022 B2 | 11/2011 | Tajima et al. | |

(Continued)

FOREIGN PATENT DOCUMENTS

| | | |
|---|---|---|
| EP | 1722522 | 11/2006 |
| WO | 00/74416 | 12/2000 |

(Continued)

OTHER PUBLICATIONS

Third Generation Partnership Project, "Technical Specification Group Radio Access Network; Physical layer procedures (FDD) (Release 1999)", 3GPP TS 25.214, V4.6.0, (Mar. 2003).

(Continued)

*Primary Examiner* — Kumar Patel
*Assistant Examiner* — Kuo Woo
(74) *Attorney, Agent, or Firm* — Yasser Mourtada (57) ABSTRACT

A method and apparatus for allocating resources to a wireless transmit receive unit (WTRU) includes the WTRU transmitting a signature sequence to a Node B, receiving an acknowledge signal from the Node B, and determining a default resource index. The resource index is associated with enhanced dedicated channel (E-DCH) parameters.

15 Claims, 6 Drawing Sheets

(56) References Cited

U.S. PATENT DOCUMENTS

| | | | |
|---|---|---|---|
| 2002/0089957 | A1 | 7/2002 | Viero |
| 2002/0141331 | A1 | 10/2002 | Mate et al. |
| 2004/0116126 | A1 | 6/2004 | Cave |
| 2005/0153715 | A1 | 7/2005 | Hwang |
| 2006/0018336 | A1 | 1/2006 | Sutivong et al. |
| 2006/0062237 | A1 | 3/2006 | Kim |
| 2006/0098599 | A1* | 5/2006 | Choi et al. ............... 370/331 |
| 2006/0195576 | A1 | 8/2006 | Rinne et al. |
| 2007/0165567 | A1 | 7/2007 | Tan et al. |
| 2007/0206531 | A1* | 9/2007 | Pajukoski et al. ......... 370/329 |
| 2007/0211671 | A1 | 9/2007 | Cha |
| 2008/0043658 | A1* | 2/2008 | Worrall ................. 370/312 |
| 2008/0089285 | A1* | 4/2008 | Pirskanen et al. ......... 370/329 |
| 2010/0105405 | A1* | 4/2010 | Vujcic .................. 455/452.1 |

FOREIGN PATENT DOCUMENTS

| | | |
|---|---|---|
| WO | WO-01/78252 | 10/2001 |
| WO | 2005/107304 | 11/2005 |
| WO | WO 2007/073040 | 6/2007 |

OTHER PUBLICATIONS

Third Generation Partnership Project, "Technical Specification Group Radio Access Network; Physical layer procedures (FDD) (Release 1999)", 3GPP TS 25.214, V5.11.0, (Jun. 2005).

Third Generation Partnership Project, "Technical Specification Group Radio Access Network; Physical layer procedures (FDD) (Release 1999)", 3GPP TS 25.214, V6.11.0, (Dec. 2006).

Third Generation Partnership Project, "Technical Specification Group Radio Access Network; Physical layer procedures (FDD) (Release 1999)", 3GPP TS 25.214, V7.6.0, (Sep. 2007).

Third Generation Partnership Project, "Technical Specification Group Radio Access Network; Physical layer procedures (FDD) (Release 1999)", 3GPP TS 25.214, V7.9.0, (May 2008).

Third Generation Partnership Project, "Technical Specification Group Radio Access Network; Physical layer procedures (FDD) (Release 1999)", 3GPP TS 25.214, V8.3.0, (Sep. 2008).

Nokia Siemens Networks et al, "Enhanced Uplink for CELL_FACH State in FDD", TSG-RAN #37 Meeting, RP-07677, (Riga, Latvia, Sep. 11-14, 2007).

Klein et al., "Reduction of Signaling Overhead in Beyond 3G MAC-Protocols using Frame Descriptor Tables," European Wireless Conference, vol. 1, pp. 260-265 (Apr. 2005).

LG Electronics Inc., "RACH procedure," 3GPP TSG-RAN WG2 #59, R2-073043 (Aug. 19-24, 2007).

Nokia Siemens Networks et al., "Enhanced Uplink for CELL_FACH State in FDD", TSG-RAN #37 Meeting, RP-07677, (Riga, Latvia, Sep. 11-14, 2007).

Motorola, "Uplink Transmission in the CELL_FACH State," 3GPP RAN1#34, Tdoc# R1-03-1046 (Oct. 6-11, 2003).

NSN et al., "Further Discussion on Enhanced Cell_FACH in REL8", 3GPP TSG-RAN WG2 Meeting #59, R2-073254, (Athens, Greece, Aug. 20-24, 2007).

Third Generation Partnership Project, "Technical Specification Group Radio Access Network; FDD Enhanced Uplink; Overall description; Stage 2 (Release 6)," 3GPP TS 25.309 V6.6.0 (Mar. 2006).

Third Generation Partnership Project, "Technical Specification Group Radio Access Network; Radio Resource Control (RRC); Protocol Specification (Release 7)", 3GPP TS 25.331, V7.10.0, (Sep. 2008).

Third Generation Partnership Project, "Technical Specification Group Radio Access Network; Radio Resource Control (RRC); Protocol Specification (Release 7)", 3GPP TS 25.331, V7.5.0, (Jun. 2007).

Third Generation Partnership Project, "Technical Specification Group Radio Access Network; Radio Resource Control (RRc); Protocol Specification (Release 7)", 3GPP TS 25.331, V8.4.0, (Sep. 2008).

Third Generation Partnership Project, "Technical Specification Group Radio Access Network; Medium Access Control (MAC) protocol specification (Release 7)", 3GPP TS 25.321, V7.5.0, (Jun. 2007).

Third Generation Partnership Project, "Technical Specification Group Radio Access Network; Medium Access Control (MAC) protocol specification (Release 7)", 3GPP TS 25.321, V8.3.0, (Sep. 2008).

Third Generation Partnership Project, "Technical Specification Group Radio Access Network; Medium Access Control (MAC) protocol specification (Release 7)", 3GPP TS 25.321, V7.10.0, (Sep. 2008).

Third Generation Partnership Project, "Technical Specification Group Radio Access Network; Physical layer procedures (FDD) (Release 1999)", 3GPP TS 25.214, V3.12.0, V3.12.0, (Mar. 2003).

Third Generation Partnership Project, "Technical Specification Group Radio Access Network; Physical layer procedures (FDD) (Release 4)", 3GPP TS 25.214, V4.6.0, (Mar. 2003).

Third Generation Partnership Project, "Technical Specification Group Radio Access Network; Physical layer procedures (FDD) (Release 5)", 3GPP TS 25.214, V5.11.0, (Jun. 2005).

Third Generation Partnership Project, "Technical Specification Group Radio Access Network; Physical layer procedures (FDD) (Release 6)", 3GPP TS 25.214, V6.11.0, (Dec. 2006).

Third Generation Partnership Project, "Technical Specification Group Radio Access Network; Physical layer procedures (FDD) (Release 7)", 3GPP TS 25.214, V7.6.0, (Sep. 2007).

Third Generation Partnership Project, "Technical Specification Group Radio Access Network; Physical layer procedures (FDD) (Release 7)", 3GPP TS 25.214, V7.9.0, (May 2008).

Third Generation Partnership Project, "Technical Specification Group Radio Access Network; Physical layer procedures (FDD) (Release 8)", 3GPP TS 25.214, V8.3.0, (Sep. 2008).

Third Generation Partnership Project, "Technical Specification Group Radio Access Network; Spreading and modulation (FDD) (Release 4)," 3GPP TS 25.213, V4.4.0 (Dec. 2003).

Third Generation Partnership Project, "Technical Specification Group Radio Access Network; Spreading and modulation (FDD) (Release 1999)," 3GPP TS 25.213, V3.9.0 (Dec. 2003).

Third Generation Partnership Project, "Technical Specification Group Radio Access Network; Spreading and modulation (FDD) (Release 5)," 3GPP TS 25.213, V5.6.0 (Jun. 2005).

Third Generation Partnership Project, "Technical Specification Group Radio Access Network; Spreading and modulation (FDD) (Release 6)," 3GPP TS 25.213, V6.5.0 (Mar. 2006).

Third Generation Partnership Project, "Technical Specification Group Radio Access Network; Spreading and modulation (FDD) (Release 7)" 3GPP TS 25.213, V7.3.0 (Sep. 2007).

Third Generation Partnership Project, "Technical Specification Group Radio Access Network; Spreading and modulation (FDD) (Release 7)" 3GPP TS 25.213, V7.6.0 (Sep. 2008).

Third Generation Partnership Project, "Technical Specification Group Radio Access Network; Spreading and modulation (FDD) (Release 8)" 3GPP TS 25.213, V8.2.0 (Sep. 2008).

Third Generation Partnership Project, "Technical Specification Group Radio Access Network; Physical channels and mapping of transport channels onto physical channels (FDD) (Release 1999)," 3GPP TS 25.211 V3.12.0 (Sep. 2002).

Third Generation Partnership Project, "Technical Specification Group Radio Access Network; Physical channels and mapping of transport channels onto physical channels (FDD) (Release 4)," 3GPP TS 25.211 V4.6.0 (Sep. 2002).

Third Generation Partnership Project, "Technical Specification Group Radio Access Network; Physical channels and mapping of transport channels onto physical channels (FDD) (Release 6)," 3GPP TS 25.211 V6.9.0 (Nov. 2007).

Third Generation Partnership Project, "Technical Specification Group Radio Access Network; Physical channels and mapping of transport channels onto physical channels (FDD) (Release 7)," 3GPP TS 25.211 V7.3.0 (Sep. 2007).

(56) References Cited

OTHER PUBLICATIONS

Third Generation Partnership Project, "Technical Specification Group Radio Access Network; Physical channels and mapping of transport channels onto physical channels (FDD) (Release 6)," 3GPP TS 25.211 V6.8.0 (Sep. 2007).
Third Generation Partnership Project, "Technical Specification Group Radio Access Network; Physical channels and mapping of transport channels onto physical channels (FDD) (Release 7)," 3GPP TS 25.211 V7.6.0 (May 2008).
Third Generation Partnership Project, "Technical Specification Group Radio Access Network; Physical channels and mapping of transport channels onto physical channels (FDD) (Release 8)," 3GPP TS 25.211 V8.2.0 (Sep. 2008).
Third Generation Partnership Project, "Technical Specification Group Radio Access Network; Physical channels and mapping of transport channels onto physical channels (FDD) (Release 5)," 3GPP TS 25.211 V5.8.0 (Dec. 2005).
Third Generation Partnership Project, "Technical Specification Group Radio Access Network; Physical layer procedures (FDD) (Release 1999)", 3GPP TS 25.214, V3.12.0, (Mar. 2003).
Third Generation Partnership Project, "Technical Specification Group Radio Access Network; Spreading and modulation (FDD) (Release 4)," 3G TS 25.213 V4.4.0 (Dec. 2003).
Third Generation Partnership Project, "Technical Specification Group Radio Access Network; Spreading and modulation (FDD) (Release 1999)," 3GPP TS 25.213 V3.9.0 (Dec. 2003).
Third Generation Partnership Project, "Technical Specification Group Radio Access Network; Spreading and modulation (FDD) (Release 5)," 3PPG TS 25.213 V5.6.0 (Jun. 2005).
Third Generation Partnership Project, "Technical Specification Group Radio Access Network; Spreading and modulation (FDD) (Release 6)," 3GPP TS 25.213 V6.5.0 (Mar. 2006).
Third Generation Partnership Project, "Technical Specification Group Radio Access Network; Spreading and modulation (FDD) (Release 7)," 3GPP TS 25.213 V7.3.0 (Sep. 2007).
Third Generation Partnership Project, "Technical Specification Group Radio Access Network; Spreading and modulation (FDD) (Release 7)," 3GPP TS 25.213 V7.6.0 (Sep. 2008).
Third Generation Partnership Project, "Technical Specification Group Radio Access Network; Spreading and modulation (FDD) (Release 8)," 3GPP TS 25.213 V8.2.0 (Sep. 2008).
Third Generation Partnership Project, "Technical Specification Group Radio Access Network; Physical channels and mapping of transport channels onto physical channels (TDD) (Release 1999)," 3GPP TS 25.221 V3.11.0 (Sep. 2002).
Third Generation Partnership Project, "Technical Specification Group Radio Access Network; Physical channels and mapping of transport channels onto physical channels (TDD) (Release 4)," 3GPP TS 25.221 V4.8.0 (Jun. 2005).
Third Generation Partnership Project, "Technical Specification Group Radio Access Network; Physical channels and mapping of transport channels onto physical channels (TDD) (Release 5)," 3GPP TS 25.221 V5.6.0 (Jun. 2005).
Third Generation Partnership Project, "Technical Specification Group Radio Access Network; Physical channels and mapping of transport channels onto physical channels (TDD) (Release 5)," 3GPP TS 25.221 V5.7.0 (Sep. 2008).
Third Generation Partnership Project, "Technical Specification Group Radio Access Network; Physical channels and mapping of transport channels onto physical channels (TDD) (Release 6)," 3GPP TS 25.221 V6.5.0 (Sep. 2005).
Third Generation Partnership Project, "Technical Specification Group Radio Access Network; Physical channels and mapping of transport channels onto physical channels (TDD) (Release 6)," 3GPP TS 25.221 V6.6.0 (Sep. 2008).
Third Generation Partnership Project, "Technical Specification Group Radio Access Network; Physical channels and mapping of transport channels onto physical channels (TDD) (Release 7)," 3GPP TS 25.221 V7.4.0 (Sep. 2007).
Third Generation Partnership Project, "Technical Specification Group Radio Access Network; Physical channels and mapping of transport channels onto physical channels (TDD) (Release 7)," 3GPP TS 25.221 V7.8.0 (Sep. 2008).
Third Generation Partnership Project, "Technical Specification Group Radio Access Network; Physical channels and mapping of transport channels onto physical channels (TDD) (Release 8)," 3GPP TS 25.221 V8.2.0 (Sep. 2008).
"Taiwan Office Action", Taiwan Application No. 100134891, Nov. 21, 2013, 6 pages.
"Taiwan Office Action", Taiwan Application No. 097137603, Nov. 25, 2013, 6 pages.
"Taiwan Office Action (English Translation)", Taiwan Application No. 100134891, Nov. 21, 2013, 4 pages.
"Taiwan Office Action (English Translation)", Taiwan Application No. 097137603, Nov. 25, 2013, 4 pages.
"Japanese Notice of Rejection", Japanese Application No. 2014-005951, Sep. 30, 2014, 2 Pages.
"Japanese Notice of Rejection (English Translation)", Japanese Application No. 2014-005951, Sep. 30, 2014, 2 Pages.
"Korean Notice of Allowance", Korean Application No. 10-2010-7010752, May 19, 2015, 2 pages.
"Korean Notice of Allowance", Korean Application No. 10-2013-7025400, May 19, 2015, 2 pages.
"Korean Notice of Allowance English Translation", Korean Application No. 10-2010-7010752, May 19, 2015, 1 page.
"Korean Notice of Allowance English Translation", Korean Application No. 10-2013-7025400, May 19, 2015, 1 page.

\* cited by examiner (PRIOR ART)
FIG. 1

METHOD AND APPARATUS TO ALLOCATE RADIO RESOURCES FOR TRANSMITTING A MESSAGE PART IN AN ENHANCED RACH

CROSS REFERENCE TO RELATED APPLICATIONS

This application claims the benefit of U.S. provisional application No. 60/975,715 and filed Sep. 27, 2007, which is incorporated by reference as if fully set forth.

FIELD OF INVENTION

This application is related to wireless communications.

BACKGROUND

In many cellular communications systems, the access to radio resources is controlled by the radio network. When a wireless transmit/receive unit (WTRU) has data to transmit to the network, it acquires radio resource access before transmitting its data payload. To achieve this in a 3rd Generation Partnership Project (3GPP) network, for example, a WTRU must gain access to the random access channel (RACH). Access to the RACH is contentious and there are mechanisms to reduce the probability of collision, that is, when two WTRUs are accessing the resource simultaneously.

Procedures for random access include a preamble phase with power ramp-up followed by channel acquisition information and message transmission. Because of the contentious nature of the RACH, to avoid WTRUs holding the shared radio resource for a long time, and because there is no power control, relatively short message payloads are transmitted on the RACH, leading to a relatively small data rate. Therefore, the RACH is generally used for the transmission of short control messages. Typically, WTRUs demanding larger data rates would be configured by the network to use dedicated resources.

While the data rate provided by the RACH is sufficient for the transmission of short control messages typical of networks supporting mostly speech communications, it is inefficient for the transmission of data messages associated with non-real-time data services, such as internet browsing, e-mail, and the like. For these data services, the traffic is bursty by nature and long periods of inactivity may exist between successive transmissions. For some applications requiring frequent transmission of keep-alive messages, for example, this may result in an inefficient utilization of dedicated resources. Therefore, it may be advantageous for the network to use shared resources for data transmission instead. The difficulty however, resides in the low data rate offered by the existing RACH.

Figure 1:
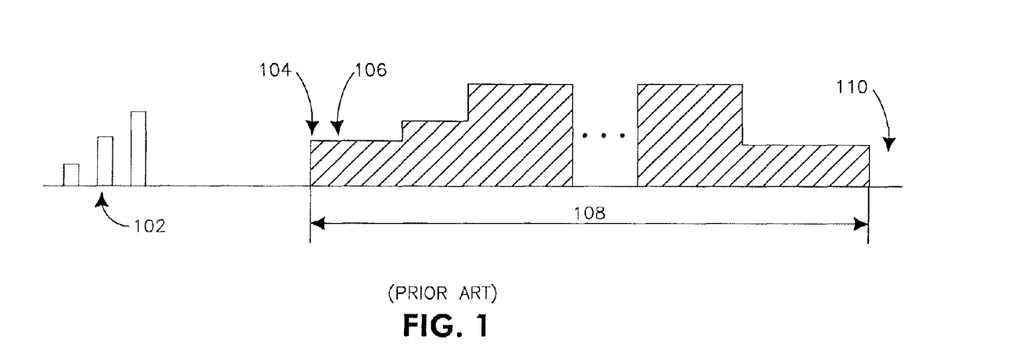
FIG. 1 shows RACH access with E-DCH in accordance with the prior art.

FIG. 1 shows RACH access with an enhanced dedicated channel (E-DCH) 100 in accordance with the prior art. A RACH access with E-DCH 100, hereafter "E-RACH", may include a RACH preamble phase 102, initial resource assignment 104, collision detection and resolution 106, an E-RACH message part 108, and release of resources 110 or transition to other state. It would be desirable to have a set of mechanisms for efficient use of the E-DCH on the E-RACH.

SUMMARY

A method and apparatus is disclosed for high speed transmission over an E-RACH. This may include a WTRU transmitting a signature sequence, receiving an acknowledge signal in response to the signature sequence and determining a default resource index. The resource index may be associated with enhanced dedicated channel (E-DCH) parameters. The WTRU may also index a set of resource parameters based on the signature sequence and a scrambling code index Also disclosed is a method and apparatus for allocating resources to a WTRU. This may include the WTRU receiving a list of resources over a broadcast channel, wherein the list of resources includes a resource allocation table.

The WTRU may also receive an allocation message. The allocation message may include a subset of a resource allocation configuration. The WTRU may also receive a balance of a resource allocation configuration in a broadcast channel.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENT(S)

When referred to hereafter, the term "wireless transmit/receive unit (WTRU)" includes, but is not limited to, a user equipment (UE), a mobile station, a fixed or mobile subscriber unit, a pager, a cellular telephone, a personal digital assistant (PDA), a computer, or any other type of user device capable of operating in a wireless environment. When referred to hereafter, the term "base station" includes, but is not limited to, a Node B, a site controller, an access point (AP), or any other type of interfacing device capable of operating in a wireless environment. When referred to herein, the terminology "acquisition indicator channel (AICH) includes, but is not limited to, the AICH, the E-AICH, or any other acquisition indicator type of channel. When referred to herein, the terminology medium access control (MAC) protocol data unit (PDU) includes, but is not limited to, a MAC-e PDU, a MAC-i PDU, or any other type of MAC-level PDU that is passed on to a higher layer.

Figure 2:
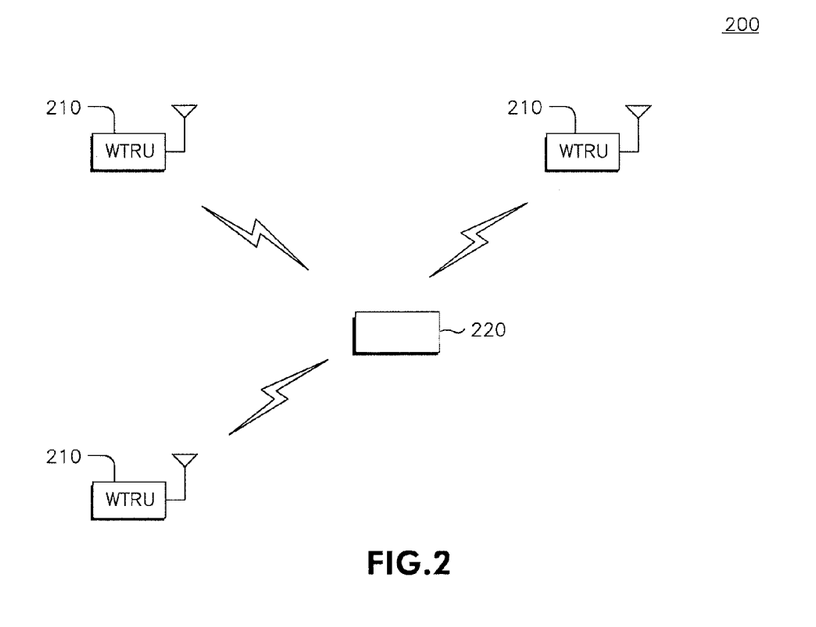
FIG. 2 shows an example wireless communication system including a plurality of wireless transmit/receive units (WTRUs) and a base station in accordance with one embodiment.

An enhanced random access channel (E-RACH) may use a subset of the functionality offered by an enhanced dedicated channel (E-DCH). FIG. 2 shows a wireless communication system 200 including a plurality of WTRUs 210 and a base station 220. As shown in FIG. 2, the WTRUs 210 are in communication with the base station 220. Although three (3) WTRUs 210 and one (1) base station 220 are shown in FIG. 2, it should be noted that any combination of wireless and wired devices may be included in the wireless communication system 200. Each WTRU 210 may communicate with the station 220 over an E-RACH.

Figure 3:
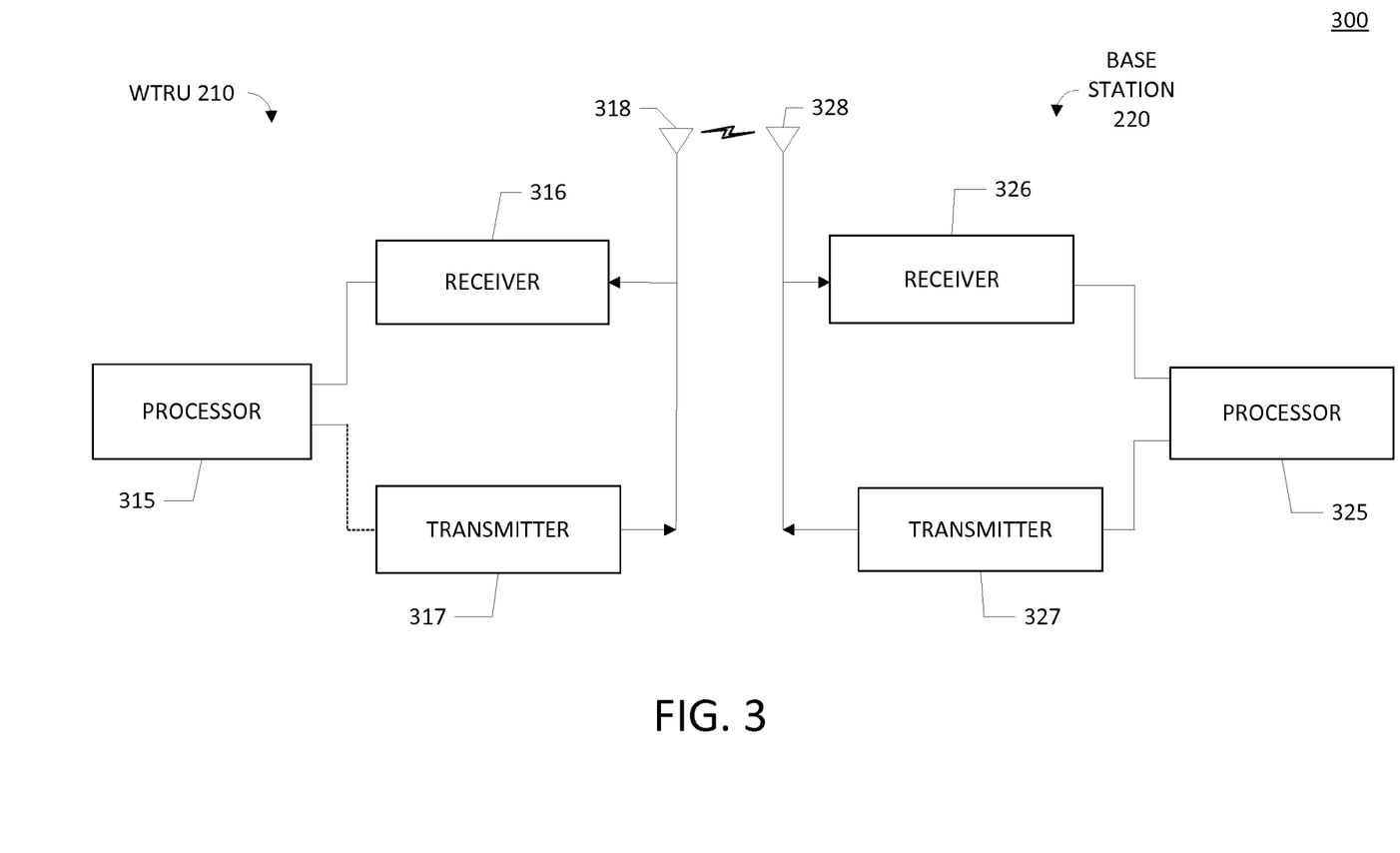
FIG. 3 is a functional block diagram of a WTRU and the base station of FIG. 2 in accordance with one embodiment.

FIG. 3 is a functional block diagram 300 of a WTRU 210 and the base station 220 of the wireless communication system 200 of FIG. 2. As shown in FIG. 2, the WTRU 210 is in communication with the base station 220. The WTRU is configured to communicate over an enhanced random access channel (E-RACH).

In addition to the components that may be found in a typical WTRU, the WTRU 210 includes a processor 315, a receiver 316, a transmitter 317, and an antenna 318. The processor 315 is configured to perform all processing required for the WTRU 210 to communicate over an E-RACH. The receiver 316 is configured to receive signals from the base station 220 and the transmitter 317 is configured to transmit signals over the E-RACH. The receiver 316 and the transmitter 317 are in communication with the processor 315. The antenna 318 is in communication with both the receiver 316 and the transmitter 317 to facilitate the transmission and reception of wireless data.

In addition to the components that may be found in a typical base station, the base station 220 includes a processor 325, a receiver 326, a transmitter 327, and an antenna 328. The receiver 326 is configured to receive signals over the E-RACH and the transmitter 327 is configured to transmit signals to the WTRU 210. The receiver 326 and the transmitter 327 are in communication with the processor 325. The antenna 328 is in communication with both the receiver 326 and the transmitter 327 to facilitate the transmission and reception of wireless data.

After a WTRU transmits a RACH preamble phase, the WTRU may be configured for radio transmission by the UMTS terrestrial radio access network (UTRAN). While some parameters are fixed and common to all WTRUs, some radio resources need to be allocated when the access is granted because of the scarcity of those resources.

Different resources may be allocated for the E-RACH transmission phase, including, for example, an uplink (UL) scrambling code, downlink (DL) forward dedicated physical channel (F-DPCH) code, offset, slot format, enhance relative grant channel (E-RGCH) from the serving cell and non-serving cells for support of soft-handover, and enhanced hybrid automatic retransmission request (HARQ) indicator channel (E-HICH) code and signatures, enhanced absolute grant channel (E-AGCH) code, enhanced radio network temporary identifier (E-RNTI), and the like.

Resources may be allocated based on implicit rules involving known parameters at both the WTRU and at a Node B. For example, the enhanced physical random access channel (E-PRACH) scrambling code index, and the signature sequence index which was acknowledged on the acquisition indicator channel (AICH) by the Node B may be known and may be used to index a set of parameters. Similarly, the access slot, access class and other parameters can be used for the implicit allocation.

Alternatively, there may be one E-RACH message part transmission at a time per E-PRACH. The network may broadcast a list of E-RACH resources that may be shared by all WTRUs. The E-RACH resources may be broadcast, for example, in a short resource allocation table transmitted on the broadcast channel in the system information block (SIB) or during WTRU configuration. Each row of the table may include the radio resource parameters to be used by the WTRU for its E-RACH message part transmission on the corresponding E-PRACH. There may be a one-to-many mapping between the PRACH resource and the E-RACH resources. In other words, a PRACH may be associated with more than one set of E-RACH resources, but the converse is not allowed. Alternatively, the WTRU can select the E-RACH resources and determine the PRACH from the mapping of a PRACH to E-RACHs.

When a WTRU gets access to the E-PRACH, such as via an ACK on the corresponding AICH, for example, it may use those resources for its E-RACH message part transmission. If the E-PRACH resource is busy, the Node B may send a NACK on the AICH, triggering a backoff mechanism at the WTRU.

Alternatively, a longer lookup table could be used for resource allocation. This table could be populated using predefined rules so that entries would not need to be transmitted explicitly. Each row of the table may include the resources used for the transmission of the E-RACH message part.

Since the table may be longer than the maximum number of E-PRACHs available, other indexing parameters may be used. Such parameters may include, for example, the signature sequence index, access slot index, and time index.

When a WTRU gets access to the E-PRACH via an ACK on the corresponding AICH, it determines the E-RACH resources by looking at the corresponding row in the table. If the resulting E-PRACH resource is busy, the Node B may send a NACK on the AICH, triggering the backoff mechanism at the WTRU.

Existing backoff mechanisms force WTRUs that have received a NACK on the AICH to wait for some time before attempting to access the RACH again, starting the procedure from the beginning. The backoff mechanism reduces the probability of having several WTRUs trying to access the channel at the same time when the channel becomes free again.

When a Node B responds to a WTRU with a NACK because the resource indexed by the implicit allocation is busy, it is likely that other resources are free. The probability of this happening is even higher for longer lookup tables. To avoid unnecessary delays, MAC-level RACH procedures may allow multiple trials at requesting resources before the backoff mechanism is triggered.

Figure 4:
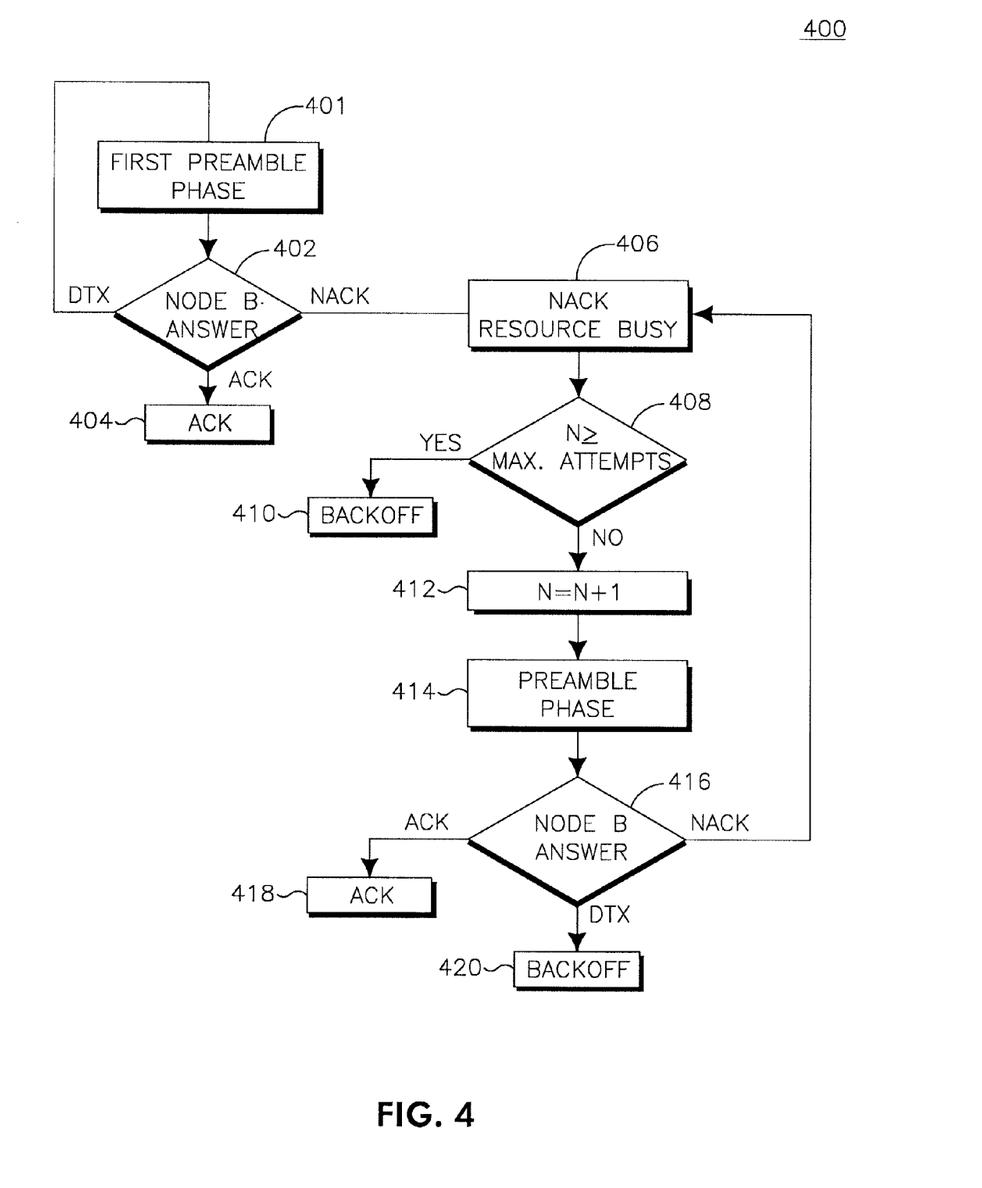
FIG. 4 is a flow diagram showing a RACH method in accordance with one embodiment.

FIG. 4 is a flow chart showing a RACH method 400. At step 401, a first preamble phase is transmitted by a WTRU. At step 402, the Node B receives the signal. If the Node B detects the preamble signature sequence, at step 404, the Node B may transmit an ACK if the resource requested by the WTRU is available. If the Node B does not receive the signal, it is in discontinuous transmit mode (DTX), and the Node B does not transmit an ACK or a NACK. If the Node B detects the preamble, but cannot allocate a resource, at step 406, the Node B transmits a NACK. At step 408 the WTRU determines if the maximum number of attempts after the first NACK has been reached. If the maximum is reached, at step 410, the WTRU institutes a back off routine. If the maximum is not reached, at step 412 and index is updated and, at step 414, the WTRU retries accessing the RACH with a different preamble in a subsequent access slot. The transmission power can be raised or kept the same. At step 416, the Node B again attempts to detect the preamble. If detected, and the resource is available, at step 418, an ACK is transmitted to the WTRU. If no resource is available, the Node B transmits and NACK and the checking for maximum number of transmissions repeats at step 406. If the Node B does not detect the preamble, it is in DTX mode, and does not send an ACK or a NACK at step 420 a backoff mechanism may be triggered by the WTRU. The maximum number of attempts following a NACK can be configured by the network or predefined.

The resources associated with the E-DCH transmission phase may be explicitly allocated. The transmission of an allocation message contains a subset of the E-DCH configuration, while the remaining configuration may be signaled on the broadcast channel or preconfigured. The allocation message is important and should be transmitted over the radio link with protection. This may require acknowledgment from the WTRU.

The allocation message may be transmitted via an enhanced forward acquisition channel (E-FACH), using high speed downlink shared channel (HS-DSCH) mechanisms. The WTRU identity may be related to the preamble signature sequence or E-PRACH that was used, with a specified timing relative to the access slot. For example, a set of temporary radio network temporary identifiers (t-RNTI) may correspond to each E-PRACH and may be broadcast to all WTRUs in a cell. Alternatively, a specific rule for implicit assignment of the t-RNTI could be defined.

The network may use a streamlined E-RACH message transmission phase after the RACH preamble phase. Rather than providing the full set of E-DCH functionalities, only a subset of these functionalities are used. The reduced set of functionalities can be signaled and configured through system information broadcasts.

All remaining parameters may be signaled through the system information block (SIB). This may include, for example, the UL scrambling code, enhanced dedicated physical downlink channel (E-DPDCH) configuration information, dedicated physical control channel (DPCCH) configuration information, radio bearer information for the logical channels mapped to the E-RACH, and the like.

The E-RACH can be configured to operate in IDLE mode and to send an RRC CONNECTION REQUEST, or to operate in CELL_FACH state after a cell reselection, in order to send a CELL UPDATE message.

The WTRU may "append" scheduling information to the preamble. This can be a reduced version of scheduling information (SI) and may provide an indication as to the buffer status and the available power headroom. To reduce the number of bits required to signal this information, the WTRU may use a coarse estimate of both of the parameters and encode the parameters in [X] bits, where X is an integer value.

A mapping can be constructed between the SI and the preamble signature sequence. The choice of a signature sequence by the WTRU may be directed by the calculated SI. By way of example, if a 2 bit SI is used, 16 signature sequences (sig_seq_0 to sig_seq_15) can be divided into 4 groups (sig_group0 to sig_group3) each with 4 unique signature sequences. The SI may be used to select one of the signature groups, and the WTRU may randomly choose one of the sequences within that group. Upon decoding the signature sequence, the Node B may cross-reference the sequence number to determine the signature group, and as a result, the transmitted SI. The Node B may send an acquisition indication. The identity of the WTRU may be determined when the Node B decodes the RACH message.

If the size of the SI exceeds 16, the number of preamble signatures can be increased from 16 to $2^k$ (where k>4). Rather than repeating the sequence 256 times in every preamble, the WTRU may repeat the new sequence $(256/(2^{(k-4)}))$ times.

Figure 5:
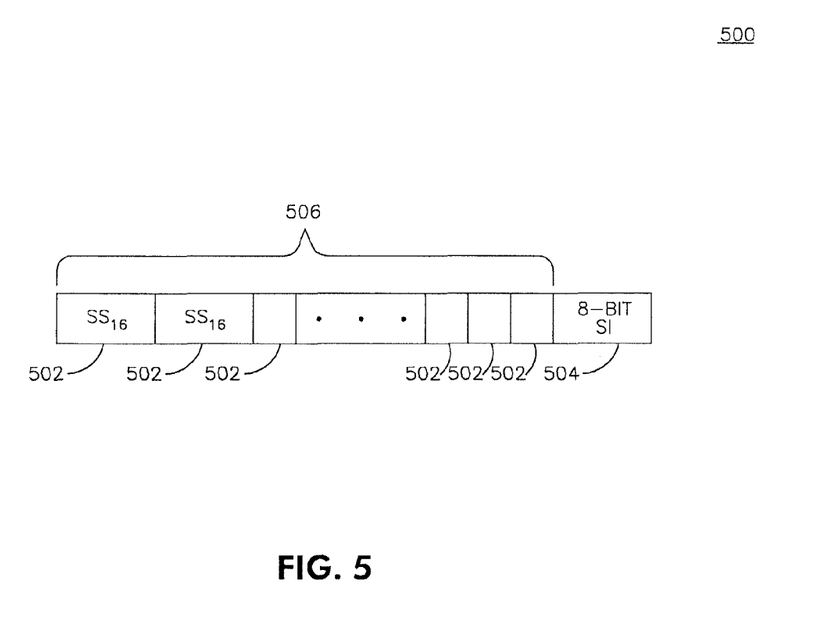
FIG. 5 shows a preamble pattern in accordance with one embodiment.

FIG. 5 shows an alternative embodiment of the SI position 500. The SI 504 can be appended at the end of each preamble 506. The preamble includes 256 copies of a 16-bit signature sequence 502. The Node B may search for the preamble 506. When the preamble 506 is detected, the Node B may detect the SI 504 at the end of the preamble 506 and send an acquisition indication. The identity of the WTRU may also be appended as a trailer.

After the WTRU receives an acquisition indication, it can send another preamble at the same transmission power. The SI information can be appended to this preamble using coding of the signature sequence or appended to a trailer.

Alternatively, a second signature can be used in the repeat preamble, with a mapping rule between the first and second signature sequences. The mapping rule can be used by the Node B to determine the transmitted SI. As a benefit, the time offset between the two preambles can be hard coded or configured through system information broadcasts and used by the Node B to perform coarse uplink synchronization.

Figure 6:
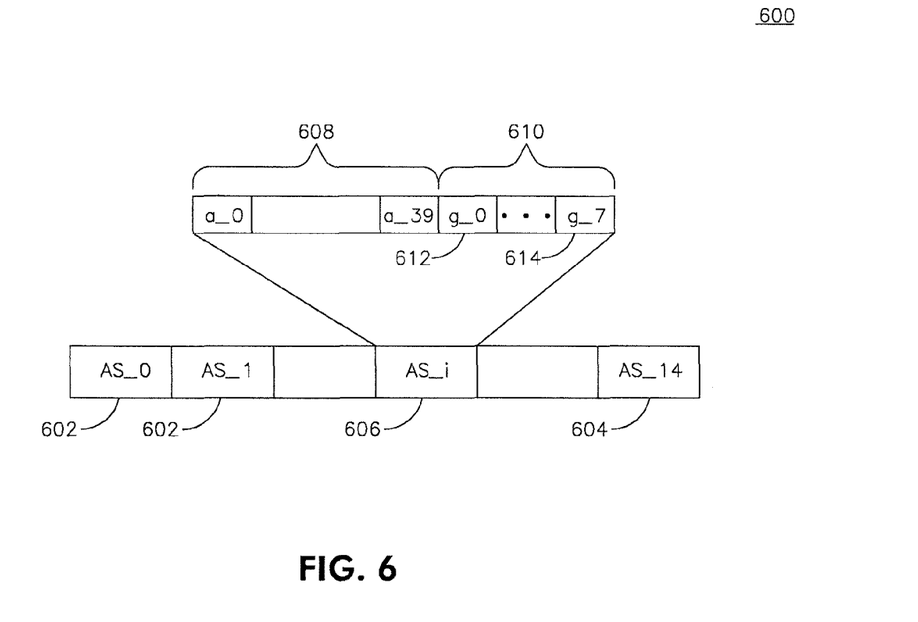
FIG. 6 shows an acquisition indicator channel (AICH) structure in accordance with one embodiment.

Grant information may be conveyed to the WTRU using the AICH or similar channel. The RAN may take advantage of the acquisition indication that is sent after the preamble acquisition to indicate to the WTRU the maximum transmission rate. FIG. 6 shows an AICH structure 600 in accordance with one embodiment. The AICH 600 includes, per 20 ms TTI, access slot AS_0 (602) through AS_14 (604). Each AS_i 606, where i is an integer between 0 and 14, includes, using SF256 channel coding, 40 real-value signals 608. The last 1024 chips 610 of AS_i 606 include 8 real-value grants, g_0 (612) through g_7 (614). Alternatively, the last 1024 chips 610 may include control information.

A predefined sequence of symbols, e.g., a signature sequence, can be defined for each of the control information levels. The mapping between symbol sequence and control information index may be known at the radio access network (RAN) and the WTRU. This mapping can be broadcast by the RAN, configured through higher layer signaling, or preconfigured.

Alternatively, the last 1024 chips of the AICH slot can be interpreted as a new bit field (e.g., 4 bits) which contains the index of the grant information, where channel coding can be used to increase decoding reliability of the bit field.

Alternatively, the grant information can be sent via a new physical layer signal.

Metrics or parameters may be used, individually or in any combination, as a grant for initial E-RACH message transmission. One such parameter is the maximum power ratio, which indicates the maximum power ratio between the E-DPDCH and E-DPCCH or the maximum power ratio between the E-DPDCH and the preamble power.

The maximum transmission power may be used. This may indicate the maximum total power that the WTRU can use for transmission of the E-DPDCH. The maximum total power can be determined as an absolute value (e.g., 20 dBm) or as a relative power with respect to the preamble power.

The value of the grant may be mapped to an index, where the mapping is known by the WTRU and UTRAN. The mapping can be broadcast over system information or hard coded in WTRU devices.

While in the CELL_DCH state, the WTRU identity is implicit since the WTRU has a dedicated connection. In the other states, the uplink channel is shared and the Node B has no means to identify the WTRU before the message part content is decoded. In the context of the E-RACH, the WTRU identity can be used by the Node B for the downlink transmission of control and data messages, and for collision detection.

The WTRU identity may be associated to the E-PRACH channel that is used. As such, the identity for each E-PRACH can be signaled by the Node B on the broadcast channel, as part of the allocation table. Linking the identity to the E-PRACH can be particularly useful in idle mode, where the WTRU has no resource or identity that has been assigned from the network.

Alternatively, the WTRU RNTI may not be directly linked to the E-PRACH. If the WTRU is already in the CELL_FACH state, it may retain its E-RNTI. This identity may be maintained for radio transmission on the E-RACH and associated control channels. If the WTRU does not already have an RNTI assigned by the network, such as when the WTRU is in idle mode, the WTRU may generate a random identity that is signaled to the network on the first radio access in the E-RACH message part. For example, the randomly generated identity could be included as part of a medium access control (MAC-e) protocol data unit (PDU). In case the identity is already in use by another WTRU, the Node B may force the termination of the E-RACH message part transmission.

Alternatively, if the WTRU does not already have a RNTI assigned by the network, the WTRU could generate an identity based on its international mobile subscriber identity (IMSI) or another unique identifier.

Although the features and elements are described herein in particular combinations, each feature or element can be used alone without the other features and elements or in various combinations with or without other features and elements. The methods or flow charts provided herein may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method, implemented by a wireless transmit/receive unit (WTRU), for allocating resources in cell forward access channel (CELL_FACH) state and IDLE mode, the method comprising:
   receiving a system information block (SIB) including a set of enhanced dedicated channel (E-DCH) access parameters;
   transmitting a random access channel (RACH) preamble using a signature sequence;
   receiving an acquisition indicator in response to the RACH preamble;
   determining an E-DCH resource based on a signature sequence index associated with the signature sequence; and
   configuring the WTRU for E-DCH transmission using the E-DCH resource.

2. The method of claim 1 wherein the acquisition indicator is received on an acquisition indicator channel (AICH).

3. The method of claim 1 wherein the SIB is received prior to transmitting the RACH preamble.

4. The method of claim 1, further comprising:
   transmitting a RACH message via an E-DCH.

5. The method of claim 1 wherein the set of E-DCH access parameters includes an E-DCH hybrid automatic repeat request (HARQ) indicator channel (E-HICH) signature.

6. The method of claim 1 wherein the set of E-DCH access parameters includes an E-DCH absolute grant channel (E-AGCH) signature.

7. The method of claim 1 wherein the SIB is received via a broadcast channel.

8. A wireless transmit/receive unit (WTRU) for allocating resources in cell forward access channel (CELL_FACH) state and IDLE mode, the WTRU comprising:
   a receiver configured for receive a system information block (SIB) including a set of enhanced dedicated channel (E-DCH) access parameters;
   a transmitter configured to transmit a random access channel (RACH) preamble using a signature sequence;
   the receiver further configured to receive an acquisition indicator in response to the RACH preamble; and
   a controller configured to determine an E-DCH resource based on a signature sequence index associated with the signature sequence;
   the controller further configured to configure the WTRU for E-DCH transmission using the E-DCH resource.

9. The WTRU of claim 8 wherein the acquisition indicator is received on an acquisition indicator channel (AICH).

10. The WTRU of claim 8 wherein the SIB is received prior to transmitting the RACH preamble.

11. The WTRU of claim 8 wherein the transmitter is further configured to transmit a RACH message via an E-DCH.

12. The WTRU of claim 8 wherein the set of E-DCH access parameters includes an E-DCH hybrid automatic repeat request (HARQ) indicator channel (E-HICH) signature.

13. The WTRU of claim 8 wherein the set of E-DCH access parameters includes an E-DCH absolute grant channel (E-AGCH) signature.

14. The WTRU of claim 8 wherein the SIB is received via a broadcast channel.

15. A method, implemented by a wireless transmit/receive unit (WTRU), for allocating resources in cell forward access channel (CELL_FACH) state and IDLE mode, the method comprising:
   receiving a system information block (SIB) including a set of enhanced dedicated channel (E-DCH) resource configurations;
   transmitting a random access channel (RACH) preamble using a signature sequence;
   receiving an acknowledgment in response to the RACH preamble;
   determining an E-DCH resource index in response to the acknowledgment;
   determining an E-DCH resource configuration using the E-DCH resource index from the set of E-DCH resource configurations; and
   configuring the WTRU for E-DCH transmission using the E-DCH resource configuration.

* * * * *